(12) United States Patent
Ehrman et al.

(10) Patent No.: US 9,330,557 B2
(45) Date of Patent: *May 3, 2016

(54) CARGO AND DOOR SENSOR

(71) Applicant: I.D. Systems, Inc., Woodcliff Lake, NJ (US)

(72) Inventors: Michael L. Ehrman, Upper Saddle River, NJ (US); Steven R. Wendler, Flower Mound, TX (US); James E. Gripp, Plano, TX (US)

(73) Assignee: I.D. SYSTEMS, INC., Woodcliff Lake, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,340

(22) Filed: Apr. 2, 2015

(65) Prior Publication Data
US 2015/0213705 A1 Jul. 30, 2015

Related U.S. Application Data

(63) Continuation of application No. 14/542,017, filed on Nov. 14, 2014, now Pat. No. 9,007,209.

(60) Provisional application No. 61/904,667, filed on Nov. 15, 2013.

(51) Int. Cl.
*G08B 21/18* (2006.01)
*G06Q 10/08* (2012.01)
*A47G 29/122* (2006.01)
*G08B 13/08* (2006.01)

(52) U.S. Cl.
CPC .......... *G08B 21/182* (2013.01); *A47G 29/1214* (2013.01); *G06Q 10/08* (2013.01); *B65D 2203/00* (2013.01); *G08B 13/08* (2013.01)

(58) Field of Classification Search
CPC ...... G08B 13/08; G08B 13/22; G08B 13/126; G08B 13/1618; G08B 29/046; G08B 21/00; G08B 21/18; G06Q 10/0833; G01S 17/89; G01S 17/026
USPC ............ 340/539.1, 539.13, 539.22, 540, 541, 340/568.1, 568.2; 382/143, 154
See application file for complete search history.

(56) References Cited

U.S. PATENT DOCUMENTS

| | | | |
|---|---|---|---|
| 4,750,197 A * | 6/1988 | Denekamp et al. | 455/404.2 |
| 7,015,824 B2 | 3/2006 | Cleveland et al. | |
| 7,421,112 B2 * | 9/2008 | Calver et al. | 382/154 |
| 7,579,941 B2 | 8/2009 | Cleveland et al. | |
| 8,310,363 B2 * | 11/2012 | Breed | 340/539.22 |
| 8,810,398 B2 | 8/2014 | Bennett et al. | |
| 2006/0181413 A1 | 8/2006 | Mostov | |
| 2006/0274191 A1 * | 12/2006 | Fry et al. | 348/370 |
| 2013/0033381 A1 * | 2/2013 | Breed | 340/568.1 |
| 2013/0211976 A1 | 8/2013 | Breed | |

* cited by examiner

*Primary Examiner* — Hung T Nguyen
(74) *Attorney, Agent, or Firm* — Lowenstein Sandler LLP

(57) ABSTRACT

Implementations for a system to receive a message indicating that an ambient light level measured by an ambient light sensor within a container exceeds a first threshold value or falls below a second threshold value; in response to the message indicating that the ambient light level exceeds the first threshold value, activate a cargo sensor; and in response to the message indicating that the ambient light level falls below the second threshold value, de-activate the cargo sensor.

15 Claims, 5 Drawing Sheets

CARGO AND DOOR SENSOR

RELATED APPLICATIONS

The present application is a continuation application of U.S. patent application Ser. No. 14/542,017, titled "Cargo and Door Sensor", filed on Nov. 14, 2014 (issued as U.S. Pat. No. 9,007,209), which in turn claims the benefit of U.S. Provisional Application Ser. No. 61/904,667, titled "Cargo and Door Sensor" filed on Nov. 15, 2013. The entire contents of U.S. patent application Ser. No. 14/542,017 and U.S. Provisional Application Ser. No. 61/904,667 are hereby incorporated by reference herein.

TECHNICAL FIELD

The present disclosure is directed to a cargo and door sensor. More particularly, the present disclosure is directed to a cargo and door sensing device with access to an ambient light sensor for a container or a trailer.

BACKGROUND

Current product offerings for cargo and door sensors use such sensors to provide information as to whether the cargo storage area is accessible. Examples of cargo and door sensors can be found in U.S. Pat. Nos. 7,015,824, 7,421,112, and 7,579,941.

The current cargo and door sensors provide a triggering event for the cargo sensor to perform measurements of the cargo area. Motion sensors are often used to determine if there is likely to be load activity, and although this is helpful, it is very imprecise as there are numerous causes for motion which are largely common in their characteristics. However, such solutions for cargo and door sensors employ the cumbersome and costly installation and use of wired or wireless distributed cargo and door sensors, which substantially increases installation time and associated labor cost, increases hardware and maintenance costs, increases the probability of sensor cabling damage, suffers erratic behavior and routine field failures, introduces performance issues which commonly plague solutions which include door sensors, and eventually is rendered useless or is ignored by the consumer.

Early ultrasonic cargo sensors were designed to look for cargo very frequently, (possibly with time-varied sampling), which causes three general problems. (1) Power consumption: Sampling for cargo, based on a schedule, increases power consumption wastefully because samples occur while the load state is static. A typical container or dry van only changes load state 5-10 times per month. The majority of the time the load state is either empty or loaded, and not in transition. Arbitrary sampling of cargo during these long dwells is wasteful in terms of power consumption. (2) Increased latency: Performing cargo samples with a periodic sampling scheme has the opportunity to increase latency, driven by the time between the actual load state change, and the time delay until the next cargo sample is scheduled. Attempting to combat the potential latency with a high rate of sampling can make power consumption dramatically worse. Whereas decreasing the sample rate to combat power consumption can make latency dramatically worse. (3) Event accuracy: Sensing cargo using ultrasonic transducers relies on the stability of the measurement conditions. Changes in the measurement conditions (most notably changes in environmental conditions) can change the results of the measurement, and in some cases, change the resulting determination of the state of the cargo. Examples of this are temperature spikes due to solar loading or rapid increases in humidity due to a rainstorm. These perturbations in the measurement conditions can cause false events to be registered, and while the load state will generally self-correct after the measurement conditions have stabilized, the false events have already occurred.

Thus, there is a need for a system and method configured to overcome the deficiencies of the conventional manner for cargo and door sensors that provides an effective alternative without added installation complexity, and robust field performance for the life of the equipment.

SUMMARY

The present disclosure relates to a cargo and door sensing system and method with access to an ambient light sensor. The system and method for the cargo and door sensor can incorporate a light sensor, situated for example at the nose of the trailer or container at a high position, and aimed at the rear doors, to provide information about the status of the rear doors, and consequently whether the cargo area is being accessed. This disclosure provides a combined benefit of robust performance, low cost, low complexity, and low power consumption.

The system and method can determine, with reasonable confidence, a likely period of time wherein a load state change is likely to be occurring in a trailer or container. This can be useful for active cargo state change determination. This permits more intelligent power-up and use of an associated cargo detection circuit, which keeps power-consumption low. This can be useful for monitoring intermodal containers and other non-powered assets.

Similarly, the system and method can determine, with reasonable confidence, a likely period of time wherein a load state change cannot be occurring. This can be useful for cargo state change filtering.

The system and method can determine, with reasonable confidence, a likely moment in time wherein the loading of a trailer or container has completed. This can be useful for tagging the time in which the container or trailer is available for pickup.

The system and method can determine, at a relatively low cost and low power, without extraneous remote sensors, and with reasonable confidence, a likely moment in time when the cargo door was opened or closed. This can be useful for monitoring access to the container or trailer, either for process refinement, dispatch triggering, or security.

The system and method can determine, with reasonable confidence, in certain circumstances, whether there is a breach of the roof or wall of a trailer or container. This can be useful for container/trailer damage assessment or monitoring for load vulnerability.

BRIEF DESCRIPTION OF THE DRAWINGS

The present disclosure will be more readily understood from the detailed description of exemplary embodiments presented below considered in conjunction with the attached drawings, of which.

It is to be understood that the attached drawing is for purposes of illustrating the concepts of the disclosure.

DETAILED DESCRIPTION

The present disclosure provides for methods and systems for a cargo and door sensing system that incorporates a combination of a motion sensor with a light sensor. In an embodiment, the light sensor may be used with or without motion sensing as an additional (clarifying) trigger. In an embodiment, the light sensor would indicate when the cargo area was accessible, and the motion sensor would indicate periods wherein the cargo was being loaded or emptied. Both would have to occur together to indicate a load state change possibility. Light without motion, or motion without light, would be ignored. In an embodiment, the light sensor may be located at different points in the container depending on users' desire focus on certain areas inside the container.

Figure 1:
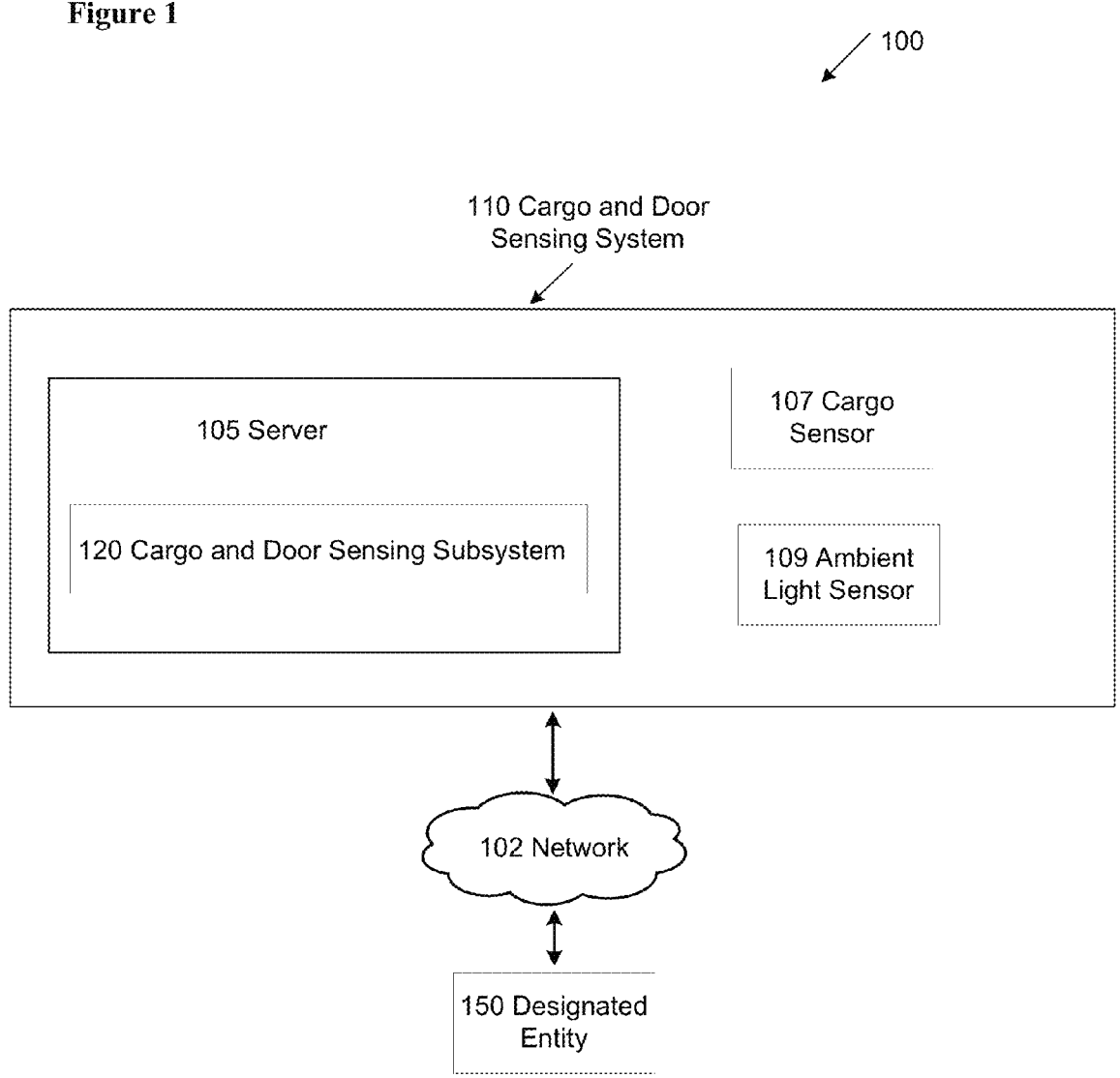
FIG. 1 illustrates a block diagram of system architecture of an example cargo door and sensing system in which implementations of the present disclosure can operate.

FIG. 1 illustrates a block diagram of system architecture 100 of an example cargo door and sensing system in which implementations of the present disclosure can operate. The system architecture 100 can include a cargo door and sensing system 110, a server 105, a network 102, a cargo and door sensing subsystem 120, a cargo sensor 107, an ambient light sensor 109, and a designated entity 150. The designated entity 150 and the server 105 may each be a computer system to run services that serves the needs of users or other computers on the network 102. An example computer system is described in greater detail below in conjunction with FIG. 5.

The server 105 can include the cargo and door sensing subsystem 120 for interacting with applications executing on computers associated with the designated entity 150 via the network 102. The cargo and door sensing subsystem 120 is described in further detail below with respect to FIG. 2. The network 102 may be any type of communications medium that allows for the designated entity 150 to communicate with the server 105. The network 102 may be, for example, cellular telephone network, a private network (e.g., a local area network (LAN), a wide area network (WAN), intranet, etc.), a corporate network (e.g., a private network for an organization such as a corporation), a satellite communications system, and/or a public network (e.g., the Internet).

In an embodiment, the cargo door and sensing system 110 includes a cargo sensor 107 that can include access to an ambient light sensor 109. In an embodiment, the cargo sensor 107 can be an ultrasonic sensor, a camera/video-based sensor, or a laser sensor, or equivalent. For example, the cargo sensing device developed by I.D. Systems™ uses ultrasonic sensors in a variety of measurement modes to look for any objects it can detect within the cargo storage area (generally 8'W× 9'H×52'L). As discussed above, changes in the measurement conditions (most notably changes in environmental conditions) can change the results of the measurement, and in some cases, change the resulting determination of the state of the cargo. Examples of this are temperature spikes due to solar loading or rapid increases in humidity due to a rainstorm. These perturbations in the measurement conditions can cause false events to be registered, and while the load state will generally self-correct after the measurement conditions have stabilized, the false events have already occurred. To minimize the potential for these false events, cargo samples should only be taken when the load state has a possibility of changing. Embodiments of this disclosure can measure the light level available and use this information to address the issues described above.

The implementation of this disclosure includes an ambient light sensor 109, which in an embodiment can be hosted by a main processor for the cargo sensor 107 or by the server 105. The ambient light sensor 109 can have an ambient light detection range from 0.25 lux to 16,383 lux as visible at the top header of the container/trailer nose. In an embodiment of this disclosure, the low-light capability of the sensor can have sensitivity down to, for example, 0.25 lux, which can detect a very marginal level of illumination entering the cargo storage area.

In an embodiment, the ambient light sensor 109 can be co-located with the cargo sensor 107 (e.g., ultrasonic transducers) on the mounting assembly, and can be aimed toward the rear doors of the container or trailer, which is the source of any light which may be entering the cargo storage area.

In an embodiment of this disclosure, the ambient light sensor 109 can collect light sensor readings at regular intervals. Typically, this can be every 30 seconds, but can vary based on operating conditions, and can be configurable. These light sensor readings can be used by the server 105 to determine if access to the cargo storage area is evident. Since an empty to load transition will always begin with the cargo storage area clear, and since a load to empty transition will always end with the cargo storage area clear, by definition the ambient light sensor 109 will have a clear view of the rear doors at some point during any load state change. Also, since light is always available during loading or unloading operations, there will always be an opportunity for the server 105 to detect that the cargo storage area is being accessed by detecting the presence of light. The source of the light may vary, and whether it is ambient sunlight, warehouse lighting, headlamps from forklifts, or another light source, some light will enter the cargo storage area during loading or unloading operations.

In an embodiment, the power requirement for the ambient light sensor 109 is significantly less than a power requirement for the cargo sensor 107. For example, a single reading by the ambient light sensor 109 may require a fraction of power required by that of a single reading by the cargo sensor 107. In an embodiment, the ambient light sensor 109 may require one unit of power to take a single reading while the cargo sensor 107 may require over 500 units of power to take a single reading. Therefore, the ambient light sensor 109 is more efficient than the cargo sensor 107 from the perspective of power consumption.

Since the source of the available light may vary, it is important that the ambient light sensor 109 is sensitive across all available wavelengths of visible light, and also tolerant of the flicker that will occur with certain types of lighting (e.g., fluorescent lighting without high frequency ballasts have a stroboscopic effect at 120 Hz). To accommodate this type of lighting, the light sensor readings should integrate samples over a period of time to determine the proper average light level. The implementation of the disclosure described herein uses a light sensor which performs this type of measurement.

In an embodiment, the light level for a container or trailer which has the doors closed is invariably measured as zero. The processor will interpret the condition of the light level equaling zero as 'dark', and the container or trailer storage area as being 'inaccessible'. However, to ensure that this condition is not transitory, the light level condition must be held throughout a soaking period before a light level state change is committed. This period is configurable, but typically is on the order of 2 minutes.

Conversely, the presence of light (non-zero readings) for a container or trailer invariably indicates that the doors are open, and consequently, the cargo storage area is 'lit' and 'accessible'. The server 105 or processor can interpret the condition of non-zero light levels as the container or trailer being 'accessible'. Similarly, this condition must be held throughout a soaking period before this light level state change is committed.

It should be noted that the absence of light at the sensor does not always signify that the container or trailer is inaccessible. However, if light is not visible by the sensor, then it is safe to assume that either (a) cargo operations are not occurring, or (b) there is sufficient cargo in the storage area that the sensor is being completely obscured. In an embodiment, the critical state changes for cargo determination are when the container or trailer initially receives a load, or when the container or trailer is completely unloaded. In both of these instances, the ambient light sensor 109 would not be obscured, and so for the purposes of cargo state determination, light sensing is still extremely useful.

For the purpose of cargo state determination, the state change of the ambient light sensor 109 from accessible to inaccessible, or from inaccessible to accessible, will typically be correlated to cargo state changes. For a typical cargo state change from empty to loaded, the sequence will be (from left to right):

| Cargo State | Empty | Empty | Load initiated... | Loaded | Loaded |
|---|---|---|---|---|---|
| Light State | Dark | Lit | Lit | Lit/Dark | Dark |
| Storage Area | Inaccessible | Accessible | Accessible | Accessible/Inaccessible | Inaccessible |
| Door State | Closed | Open | Open | Open | Closed |

The light state will always transition to 'lit' at or before the loading operation is initiated. The light state will always transition to 'dark' at or after the loading operation was initiated. As such, the transition period wherein the light state changes from dark, to lit, and back to dark is the time period that the cargo storage area could have received a load. Conversely, the cargo storage area could not have received a load prior to the transition to light. If the cargo storage area was still empty after returning to dark, it could not have received a load after the transition back to dark.

For an empty container or trailer, the ambient light sensor 109 can provide an extremely valuable indication of the period of time at which the cargo state could have changed to loaded. In an embodiment, the sensor uses this trigger to concentrate ultrasonic cargo samples during this period of activity. And similarly, the sensor largely ignores periods of time wherein a cargo state change cannot be occurring. After an extended lapse of time since the last detection of light, the sensor will cease ultrasonic cargo samples.

In an embodiment, the method works just as well for cargo state changes from loaded to empty. For a typical cargo state change from loaded to empty, the sequence will be (from left to right):

| Cargo State | Loaded | Loaded | Unload initiated... | Empty | Empty |
|---|---|---|---|---|---|
| Light State | Dark | Dark/Lit | Dark/Lit | Lit | Dark |
| Storage Area | Inaccessible | Inaccessible/Accessible | Inaccessible/Accessible | Accessible | Inaccessible |
| Door State | Closed | Open | Open | Open | Closed |

The light state will always transition to 'lit' at or before the unloading operation is completed. The light state will always transition to 'dark' at or after the unloading operation was completed. As such, the transition period wherein the light state changes from dark, to lit, and back to dark is the time period that the cargo storage area could have been unloaded. Conversely, the cargo storage area could not have been unloaded prior to the transition to light. If the cargo storage area was still loaded after returning to dark, it could not have been unloaded after the transition back to dark.

For a loaded container or trailer, the ambient light sensor 109 can provide an extremely valuable indication of the period of time at which the cargo state could have changed to empty. In an embodiment, the ambient light sensor 109 can use this trigger to concentrate ultrasonic cargo samples during this period of activity. And similarly, the ambient light sensor 109 can largely ignore periods of time wherein a cargo state change cannot be occurring. In an embodiment, after an extended lapse of time since the last detection of light, the sensor will cease cargo samples taken by the cargo sensor 107.

In an embodiment, a variation of a container or trailer operation is the live load scenario, wherein a load can be delivered to a location, and a new load received at that same location. For this scenario, the doors may be opened only once. This is simply a merge of the two state transitions described above. However, the light level will typically only persist while empty. For a typical cargo state change from loaded to empty, and back to loaded, the sequence will be (from left to right):

| Cargo State | Loaded | Loaded | Unload initiated... | Empty | Load initiated... | Loaded | Loaded |
|---|---|---|---|---|---|---|---|
| Light State | Dark | Dark/Lit | Dark/Lit | Lit | Lit | Lit/Dark | Dark |
| Storage Area | Inaccessible | Inaccessible/Accessible | Inaccessible/Accessible | Accessible | Accessible | Accessible/Inaccessible | Inaccessible |
| Door State | Closed | Open | Open | Open | Open | Open | Closed |

As before, the ambient light sensor 109 will always transition to being lit at or after the cargo state change transitions to empty, and at or before the cargo state transitions to loaded. Although the period of time that the cargo storage area may be empty, the ambient light sensor 109 will have multiple opportunities to detect this period of time, and the ambient light sensor 109 will concentrate cargo samples during this period of time to determine whether the unload operation had completed, or whether the subsequent load operation had begun.

In this regard, the ambient light sensor 109 can be even more effective than a wired door sensor, in that the door could be open for hours (or even days) prior to the unload operation completing. And similarly, the subsequent load operation can also take hours or days. The period of time that the ambient light sensor 109 state is 'lit', (and consequently the sensor determines the cargo storage area as 'accessible') may be a shorter period of time, but is certain to include the period of time that the container or trailer is empty. This narrowly focused period of time offers the opportunity for improved power consumption, improved latency, and more accurate event determination.

Although the sensor only requires the addition of light sensing to be useful for focused cargo state determination, the introduction of motion sensing offers the opportunity for further concentration of ultrasonic cargo sampling. While the presence of light determines a period of time wherein the cargo state could be changing, the container or trailer may sit idle for a period of time with the doors open and light visible in the cargo storage area. The additional information available with motion sensing provides the opportunity to ignore periods of time where there is an absence of motion. The loading and unloading of pallets of cargo (typically performed with forklifts or other heavy equipment) causes significant vibration of the container or trailer. A sensitive motion sensor, accessible by the processor for the cargo sensor device, can be used to determine if the container or trailer is idle, and regardless of whether the current light state is lit or dark, and regardless of whether the current cargo state is loaded or empty, the cargo state is very unlikely to change while the cargo storage area is still and absent of any vibration. Whereas if the motion sensor is active, and the light state is lit, then it is very likely that a load or unload operation is occurring. This augmentation of the sensor offers further improvements in the areas of power consumption, event latency, and cargo state accuracy.

A further use of light sensing for cargo state reporting is for determining when a loading operation has been completed. Ultrasonic cargo sensors typically require only one sufficiently-sized object to be placed within the cargo storage area to determine that the container or trailer is 'loaded'. Generally, if a container or trailer is not empty, it is considered to be loaded. However, the loading operation can progress for a significant period of time before the container or trailer has been entirely loaded. Drivers should not be dispatched to the container or trailer for pickup until the loading operation is complete. So while determining that the container or trailer is not empty at the beginning of a loading operation is useful for the assessment and allocation of the container or trailer as a useable asset, it is not as useful for the assignment of a driver or tractor for the pickup of the load. For this reason, it is useful for the customer of the container (i.e., an example of the designated entity 150) or trailer to have knowledge when the load operation has begun, as well as when the load operation has completed.

In an embodiment, the ambient light sensor 109 can be positioned as high as possible within the cargo storage area, for example, approximately 3 cm from the ceiling of the container or trailer, which typically provides a line-of-sight from the sensor to the rear doors throughout the loading operation. Due to the internal structure of the container or trailer, and due to the requisite lifting of pallets or materiel while positioning them into the cargo storage area, there is typically a gap of several centimeters between the cargo and the ceiling of the container or trailer. This gap allows light to filter into the cargo storage area and to be detected by the light sensor. The ambient light sensor 109, with a sensitivity of for example 0.25 lux, can detect very low light levels. As long as any light is visible to the ambient light sensor 109, the loading operation can be considered to be 'in progress.'

In an embodiment, two events can be generated by the sensor based on a determination of the loading operation by the cargo door and sensing system 110. At the moment that the load is first detected, an event will be generated to indicate that the loading operation has begun. This is typically consistent with the detection of the first few pallets placed within the cargo storage area. If the ambient light sensor 109 still detects light at this time, the ambient light sensor 109 can continue to monitor light levels periodically. Since it is paramount that any light be detected, and since the presence of light could be fleeting, the rate at which light sensor samples will be taken is generally increased, for example, to a sample rate of every 5 seconds, but is configurable.

For as long as light is detected, and the cargo state remains in the loaded state, the loading operation can be considered to be in progress. When light is first detected as absent, the cargo door and sensing system 110 can initiate a timer to confirm that light is persistently absent and to confirm that the container or trailer is 'dark'. In an embodiment, the use of the timer improves the accuracy of the sensor. There are scenarios where the light sensor may be momentarily obscured, (e.g., by a pallet lifted against the sensor by a forklift), or the light source may be momentary (e.g., the headlamps of a forklift entering and exiting the container or trailer). The soaking period used by the sensor is configurable, but is typically set to 15 minutes. If the ambient light sensor 109 does not observe any visible light for the duration of the timer, with frequent ambient light sensor 109 samples throughout the duration, then the cargo storage area can be considered to be 'dark', and the loading operation is considered to be complete. In an embodiment, the ambient light sensor 109 can generate a second event to indicate that the loading operation has completed, and will commit the cargo state to be loaded.

Using the empty to load scenario described earlier, the migration of the cargo state sequence is exhibited below, with the beginning and end of the loading state shown.

| Cargo State | Empty | Empty | Load initiated . . . | Loading . . . | Loaded |
|---|---|---|---|---|---|
| Light State | Dark | Lit | Lit | Dim | Dark |
| Storage Area | Inaccessible | Accessible | Accessible | Accessible | Inaccessible |
| Door State | Closed | Open | Open | Open | Closed |
| Loading State | | | Loading Begun * | Loading In Progress | Loading Complete * |

* Event generated

Note that while the light level may diminish throughout the loading operation, as the increase of cargo within the storage area further and further obscures the ambient light sensor 109, the loading operation will persist as 'in progress' as long as available light is visible. Eventually, the light sensor will be absent of visible light for the duration of the available timer, and the cargo door and sensing system 110 will generate a 'loading complete' event.

Although there are scenarios of operation where the ambient light sensor 109 may be completely shielded from available light for the duration of the timer, and the loading operation has not completed, or the doors are still open, in practice these scenarios will be extremely uncommon. And although the use of a door sensor provides a more emphatic trigger for the completion of a loading operation, the benefits of a door sensor are outweighed by the high cost, increased complexity, and poor long-term reliability of door sensors for containers or trailers (which are typically vigorously handled throughout their life cycle). Consequently, door sensors are not a practical and often deployed solution in the transportation industry. The integration of a cargo door and sensing system 110, as described in this disclosure, offers a practical, low cost, low complexity, and highly reliable long-term solution for the transportation industry, with loading begun/complete event accuracy very nearly approaching the performance of a door sensor.

With the additional benefits of improved power consumption, reduced latency of state change, and improved event accuracy due to the integration of light sensing with cargo sensing, the sensor offers dramatic improvements over current state of the art solutions available in the industry today.

Figure 2:
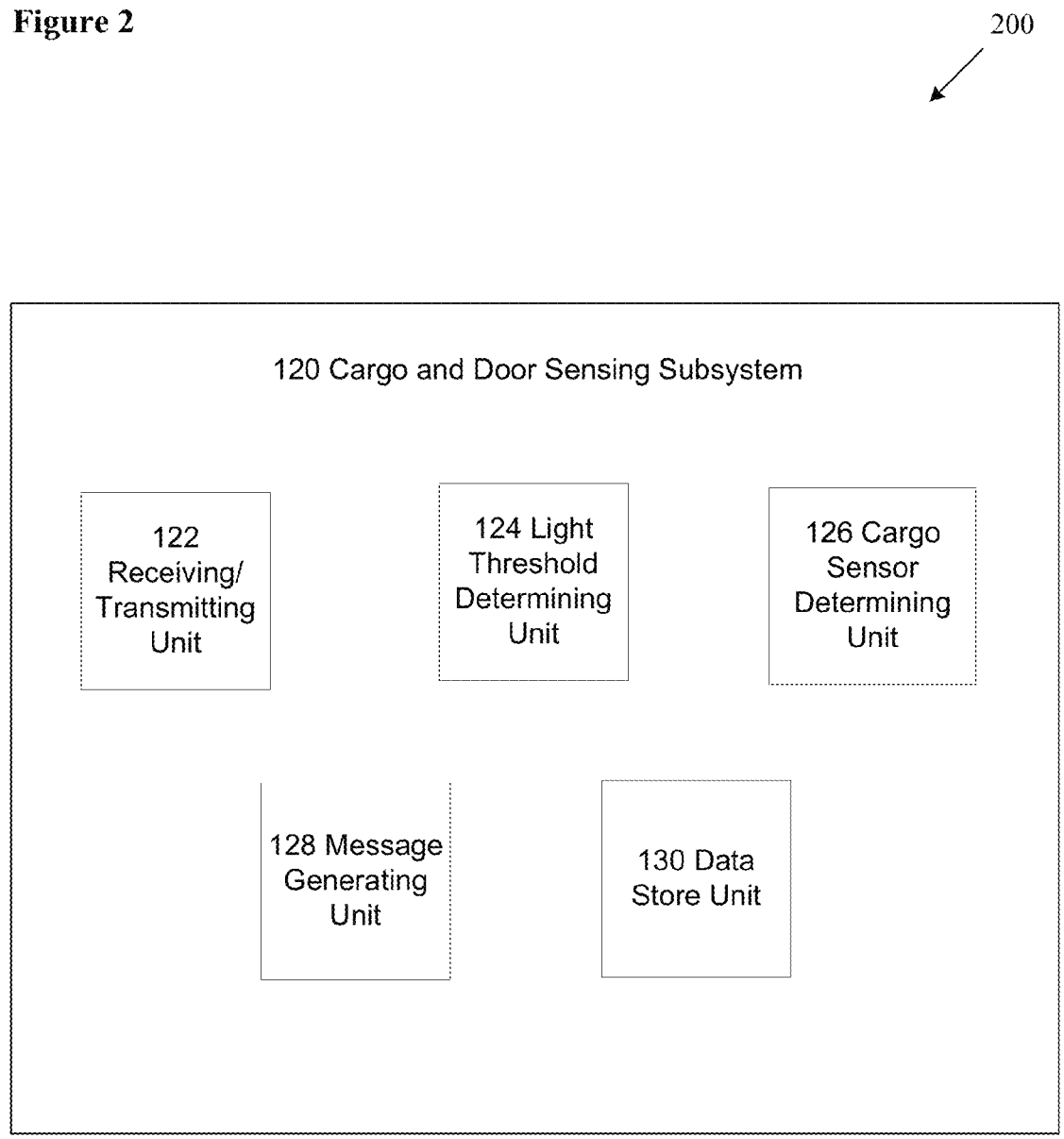
FIG. 2 illustrates a block diagram of an example cargo and door sensor subsystem in accordance with the present disclosure.

FIG. 2 illustrates a block diagram 200 of an example cargo and door sensor subsystem 120 in accordance with the present disclosure. The cargo and door sensor subsystem 120 may include a receiving/transmitting unit 122, a light threshold determining unit 124, a cargo sensor determining unit 126, a message generating unit 128, and a data store 130.

The data store unit 130 may be a main memory (e.g., read-only memory (ROM), flash memory, dynamic random access memory (DRAM) such as synchronous DRAM (SDRAM), etc.), a static memory (e.g., flash memory, static random access memory (SRAM), etc.), and a secondary memory (e.g., a data storage device), which communicate with each other via a bus. The data store unit 130 may be responsible for storing information, such as threshold information that can be used by the light threshold determining unit 124 and by the cargo sensor determining unit 126. Other forms of information that can be stored include, but are not limited to, the association of the cargo and door sensing system 110 with a respective designated entity 130.

The receiving/transmitting unit 122 may be responsible for receiving a message indicating an ambient light level measured by the ambient light sensor 109. The receiving/transmitting unit 122 can transmit the ambient light level to the light threshold determining unit 124 to determine whether the ambient light level exceeds a first threshold value or falls below a second threshold value. If the ambient light level exceeds the first threshold value, which can indicate that a container door is open, the cargo sensor determining unit 126 can activate the cargo sensor 107. If the ambient light level falls below the second threshold value, which can indicate that a container door is closed, the cargo sensor determining unit 126 can de-activate the cargo sensor 107.

In an embodiment, when the message indicating the ambient light level measured by the ambient light sensor 109 indicates that the ambient light level exceeds the first threshold value, which reasonably indicates that the container door is open, the cargo and door sensing subsystem 120 can determine whether a time associated with the message indicating that the ambient light level exceeds the first threshold value falls within a prohibited time window. For example, the prohibited time window can be based on the time of day, for example, to satisfy a rule indicating that the container door shall not be opened at night time. The prohibited time window can also include the time prior to the expected arrival time of the container. In a hypothetical case for purposes of illustration and not limitation, if a container is scheduled to arrive to its final destination on the $10^{th}$ day of the month and the container should not be opened prior to its arrival to the final destination on the $10^{th}$ day of the month, the prohibited time window can include the time prior to the $10^{th}$ day of the month. The data store unit 130 can store information regarding certain times that the container door can be open. When cargo and door sensing subsystem 120 determines that the container door is open during the prohibited time window, the message generating unit 128 can generate an alert message indicating that the container door is open during the prohibited time window, and the alert message can be sent to the designated entity 150.

In an embodiment, when the message indicating the ambient light level measured by the ambient light sensor 109 indicates that the ambient light level exceeds the first threshold value, which reasonably indicates that the container door is open, the cargo and door sensing subsystem 120 can determine whether a time associated with the message indicating that the ambient light level exceeds the first threshold value occurs during a prohibited state, which is a state of the container during which the cargo door should not be opened. In an embodiment, examples of a prohibited state can include, but are not limited to, geo-location, motion of the container, and command. In an embodiment, the cargo and door sensor subsystem 120 can use a global positioning system (GPS) to determine a current location of the container. In an embodiment, the cargo and door sensor subsystem 120 can determine whether the container is in a prohibited state based on the location of the container. For example, if the current location of the container is not at a loading center or a distribution center, which in this hypothetical non-limiting example are the only two locations where the cargo door is permitted to be open, the cargo and door sensor subsystem 120 can determine that the container is in a prohibited state.

In an embodiment, the cargo and door sensor subsystem 120 can use a motion sensor to determine whether the container is in motion. In an embodiment, the cargo and door sensor subsystem 120 can determine whether the container is in a prohibited state based on whether the container is in motion. In a hypothetical non-limiting example for purposes of illustration, when the cargo and door sensor subsystem 120 determines that the container is in motion, the cargo and door sensor subsystem 120 can determine that the container is in a prohibited state.

In an embodiment, the cargo and door sensor subsystem 120 can receive a message indicating the configuration environment of the container and can determine whether the container is in a prohibited state based on the configuration environment of the container. Examples of the configuration environment of the container can include different scenarios such as the container is attached to a truck (i.e., a tractor trailer), the container is on a rail for transport via train (i.e., rail mode), the container is on an airplane, the container is on a boat, and the like. In a hypothetical non-limiting example for purposes of illustration, the cargo and door sensor subsystem 120 can determine that the container is in a prohibited state when the container is on a rail and not when the container is attached to a truck.

In an embodiment, the cargo and door sensor subsystem 120 can receive a message indicating the configuration environment of the container and can determine whether the container is in a prohibited state based on the configuration environment of the container. Examples of the configuration environment of the container can include different scenarios such as the container is attached to a truck (i.e., a tractor trailer), the container is on a rail for transport via train (i.e., rail mode), the container is on an airplane, the container is on a boat, and the like. In an embodiment, the configuration environment of the container can be received by cargo and door sensor subsystem 120, via the network 102, from a database that indicated the present state of the container. In a hypothetical non-limiting example for purposes of illustration, the cargo and door sensor subsystem 120 can determine that the container is in a prohibited state when the container is on a rail and not when the container is attached to a truck.

In an embodiment, the cargo and door sensor subsystem 120 can receive a message indicating that the container is in a prohibited state. The message indicating that the container is in a prohibited state can be generated by a physical button, a switch, a card reader, and the like. In a non-limiting example for illustration purposes only, after loading cargo onto the container and closing the container door, a shipper can generate the message (e.g., by pressing a switch or swiping a card etc.) that indicates that the container is in a prohibited state and that the container door should not be opened again until the switch is pressed or card is swiped again.

In an embodiment, when cargo and door sensing subsystem 120 determines that the container door is open during a prohibited state, the message generating unit 128 can generate an alert message indicating that the container door is open during a prohibited state, and the alert message can be sent to the designated entity 150.

In an embodiment, if the light threshold determining unit determines that the ambient light level exceeds the first threshold value, which can indicate that a container door is open, the cargo and door sensing subsystem 120 can increase the sample rate of the ambient light sensor 109 so that the ambient light sensor 109 can increase the sample rate of sensor readings. This can provide additional accuracy in determining when the cargo door is closed.

In an embodiment, if the light threshold determining unit determines that the ambient light level exceeds the first threshold value, which can indicate that a container door is open, and if the receiving/transmitting unit 122 receives a message from the cargo sensor 107 indicating that cargo is being loaded onto or unloaded from the container, the cargo sensor determining unit 126 can modify the sample rate of either the cargo sensor 107 or the ambient light sensor 109, or both the cargo sensor 107 and the ambient light sensor 109. For example, when the cargo and door sensing subsystem 120 determines that cargo is actively being loaded or unloaded, the sampling rate of the sensors can be increased to provider further accuracy in determining when the cargo activity is finished and/or when the container door is closed. In an embodiment, the higher sampling rate of the sensors can be used throughout a predetermined time window to gain confidence as to the validity of the cargo state change. In an embodiment, the predetermined time window can be, for example, several minutes (e.g., 5 minutes, 10 minutes, 15 minutes, and the like). A purpose of the use of the higher sampling rate is to validate that the detection of a cargo loading/unloading event is in fact a change in cargo instead of a transitory event. A transitory event can be an event that could cause the sensor to falsely indicate a cargo state change, such as, for example, a person who enters the container to take an inventory reading but not to move cargo or a foreman inspects the container but does not unload or load cargo. A transitory event can also be related to the current weather, for example, a change in humidity can cause the sensor to falsely indicate a cargo state change. In an embodiment, the predetermined time window for the use of the higher sampling rate can vary and can be based upon whether or not the container has cargo. For example, if the cargo and door sensing subsystem 120 determines that the container does not contain cargo, then the predetermined time window for the use of the higher sampling rate can be less than when the cargo and door sensing subsystem 120 indicates that the container contains cargo. In this case, when the cargo and door sensing subsystem 120 determines that the container is empty, the predetermined time window can begin upon the determination that the container is empty. Since the container door will not likely remain open for a long period of time after the container is empty, the predetermined time window can be relatively short (e.g., 5 minutes). In an embodiment, the predetermined time window for the use of the higher sampling rate can be initiated when the cargo and door sensing subsystem 120 determines that cargo has been loaded onto an empty container. In this example, the cargo and door sensing subsystem 120 will use the higher sampling rate for the predetermined time window to confirm that the container is no longer empty. In an embodiment, the predetermined time window to confirm that the container is no longer empty can be longer than the predetermined time window to confirm that the container is empty (e.g., 15 minutes vs. 5 minutes, respectively) because generally, the container door will remain open for a longer period when cargo is being loaded.

Figure 3A:
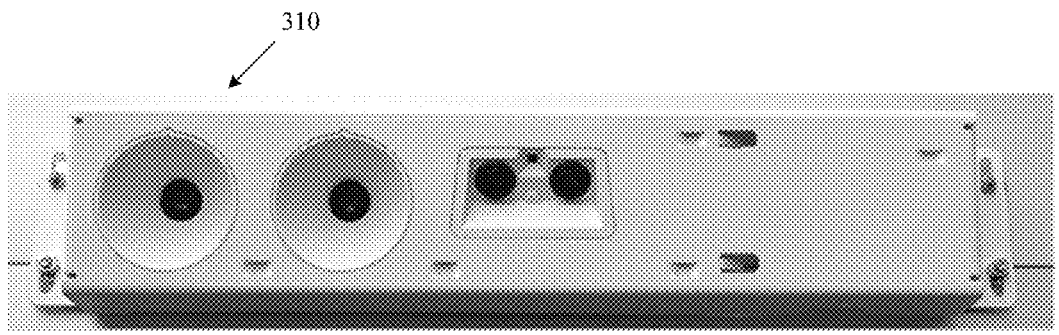
FIGS. 3A and 3B an embodiment of an example cargo and door sensor subsystem in accordance with the present disclosure.
Figure 3B:
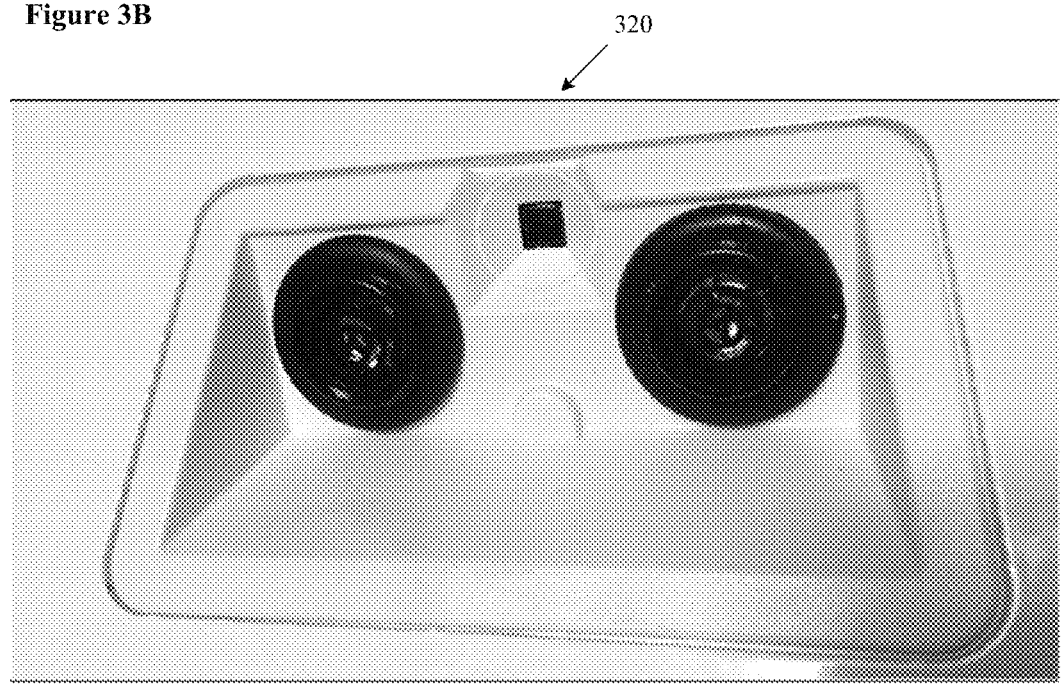

FIGS. 3A and 3B an embodiment of an example cargo and door sensor subsystem in accordance with the present disclosure. FIG. 3A illustrates the header-mounted cargo sensor 310, and FIG. 3B illustrates an expanded picture of the "short range" ultrasonic transducer assembly 320, with the ambient light sensor circled. The configuration of the cargo sensor can be configured such that the light sensor is mounted in a location where it would have visibility of the rear doors, and that the processor responsible for performing cargo sensor measurements have access to the light level information. It is beneficial for the light sensor to be mounted high so as to have the best possible vantage point above cargo that could obscure the sensor. The header mount shown (typically mounted flush to the ceiling) offered the best performance during testing.

Figure 4:
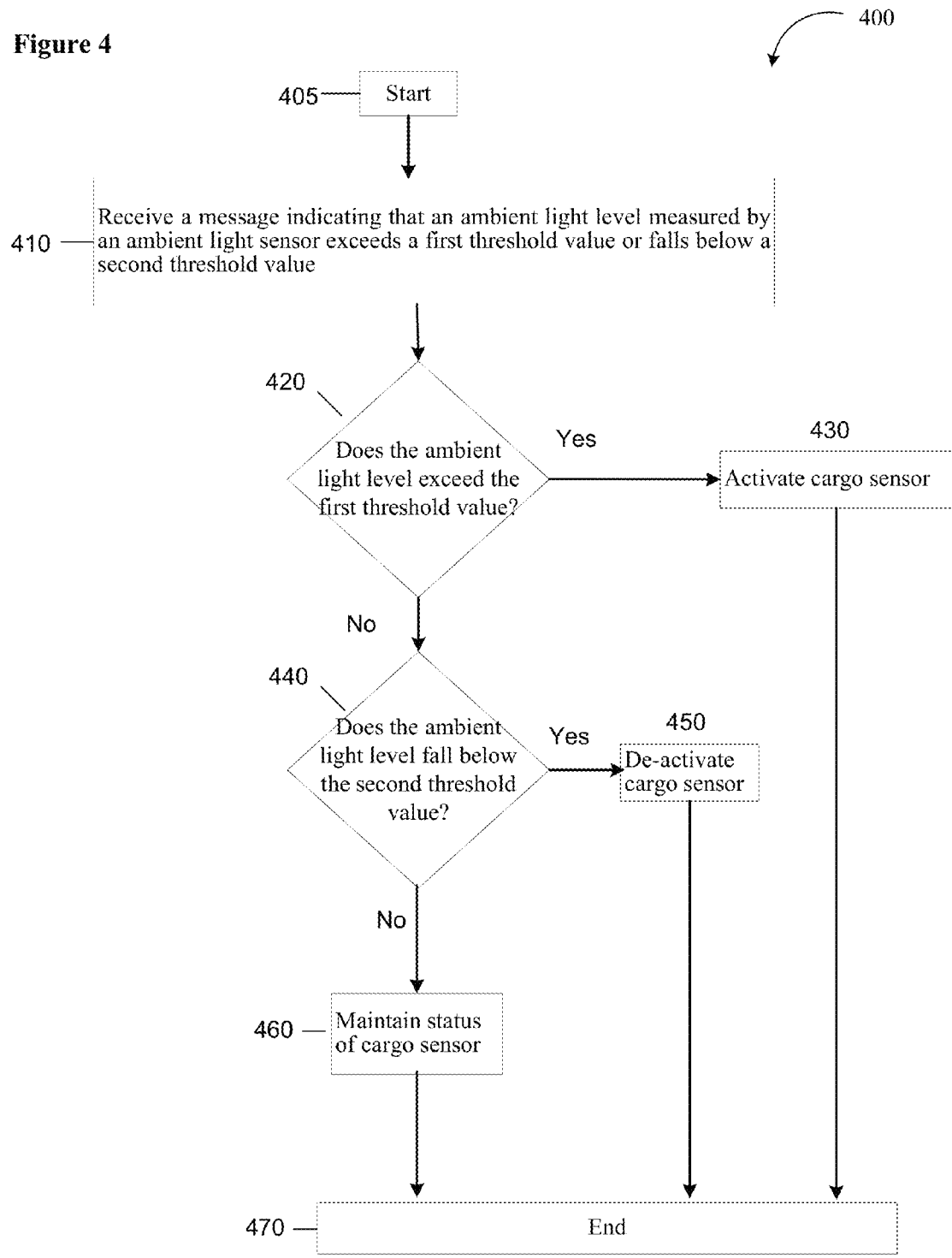
FIG. 4 is a flowchart that diagrams a method of an example cargo and door sensor system in accordance with the present disclosure.

FIG. 4 is a flowchart that diagrams a method 400 of an example cargo and door sensor system in accordance with the present disclosure. The method 400 can be performed by processing logic that may comprise hardware (circuitry, dedicated logic, etc.), software (such may be executed on a general-purpose computing system or a dedicated machine), or a combination of both. At block 405, the method 400 begins. At block 410, the processing logic may receive a message indicating that an ambient light level measured by an ambient light sensor exceeds a first threshold value or falls below a second threshold value. At block 420, the processing logic may determine if the ambient light level exceeds the first threshold value, which may indicate that a cargo door is open. If it is determined that the ambient light level exceeds the first threshold value, then at block 430 the processing logic may activate a cargo sensor and the method ends at block 470.

Reverting to block 420, if the processing logic determines that the ambient light level does not exceed the first threshold value, then at block 440, the processing logic may determine if the ambient light level falls below a second threshold value, which may indicate that the cargo door is closed. If it is determined that the ambient light level falls below the second threshold value, then at block 450 the processing logic may de-activate the cargo sensor and the method ends at block 470.

Reverting to block 440, if the processing logic determines that the ambient light level does not fall below the second threshold value, which may indicate that the state of the cargo door has not changed, then at block 460 the processing logic can determine that the status of the cargo sensor should be maintained and the method ends at block 470.

Figure 5:
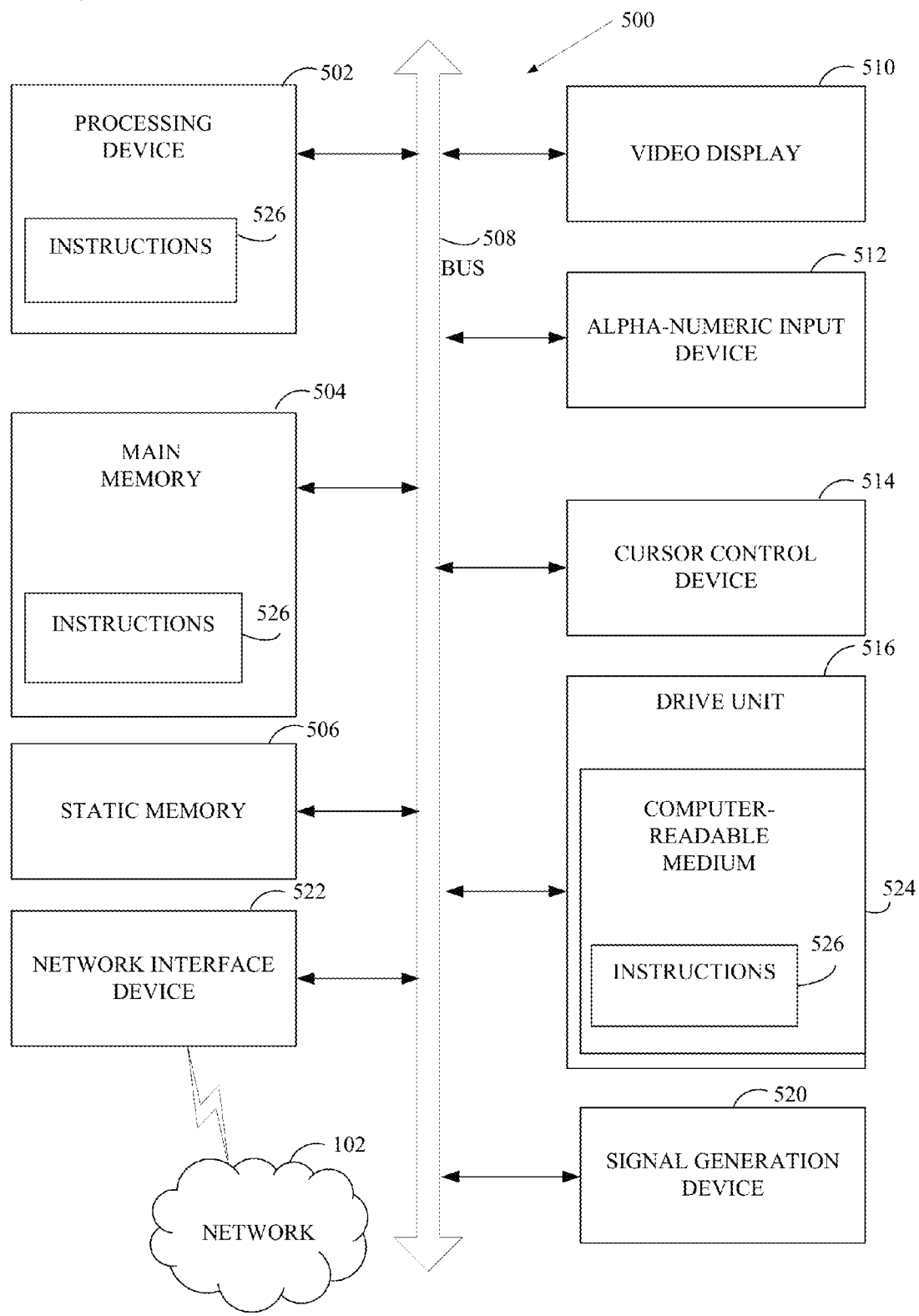
FIG. 5 is a block diagram of a computer system that may perform one or more of the operations described herein.

FIG. 5 illustrates a diagrammatic representation of a machine in the form of a computer system, in accordance with one example. The computing system may include a set of instructions 526 for creating a cargo and door sensing device with access to an ambient light sensor for a container or a trailer. In alternative examples, the machine may be connected (e.g., networked) to other machines in a Local Area Network (LAN), an intranet, an extranet, a satellite communications system, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 may further include a network interface device 522. The network interface device may be in communication with a network 102. The computer system 500 also may include a video display unit 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a computer-readable storage medium (or more specifically a non-transitory computer-readable storage medium) 524 on which is stored one or more sets of instructions 526 for the cargo and door sensing device with access to an ambient light sensor for a container or a trailer for the computer system 500 representing any one or more of the methodologies or functions described herein. The instructions 526 for the computer system 500 may also reside, completely or at least partially, within the main memory 504 and/or within the processing device 502 during execution thereof by the computer system 500, the main memory 504 and the processing device 502 also constituting computer-readable storage media. The instructions for creating a volatility index 526 for the computer system 500 may further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions for creating a volatility index 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
   a memory device to store instructions; and
   a processing device operatively coupled to the memory device, the processing device to execute the instructions to:
   receive, from a light sensor, a first reading indicating a first light level in a container comprising a container door;
   determine the container door is open in view of the first light level exceeding a first threshold value;
   receive, from the light sensor, a second reading indicating a second light level in the container; and
   determine the container door is closed in view of the second light level falling below a second threshold value.

2. The system of claim 1, the processing device to:
   de-activate a cargo sensor in view of the second light level falling below the second threshold value.

3. The system of claim 1, the processing device to:
   activate a cargo sensor in response to the first light level exceeding the first threshold value; and
   collect, by the cargo sensor, a sample indicating a cargo state of the container, wherein the cargo state is at least one of empty, load initiated, unload initiated, or loaded.

4. The system of claim 1, the processing device to determine the first light level exceeds the first threshold value when a predetermined number of samples of the first light level exceed the first threshold value during a time window.

5. The system of claim 1, the processing device to determine a cargo area of the container is not secure when the first light level exceeds the first threshold value and a rate of motion exceeds a first motion threshold value.

6. A method comprising:
   receiving, from a light sensor, a first reading indicating a first light level in a container comprising a container door;
   determining, by a processing device, the container door is open in view of the first light level exceeding a first threshold value;
   receiving, from the light sensor, a second reading indicating a second light level in the container; and
   determining the container door is closed in view of the second light level falling below a second threshold value.

7. The method of claim 6, further comprising:
   de-activating a cargo sensor in view of the second light level falling below the second threshold value.

8. The method of claim 6, further comprising:
   activating a cargo sensor in response to the first light level exceeding the first threshold value; and
   collecting, by the cargo sensor, a sample indicating a cargo state of the container,
   wherein the cargo state is at least one of empty, load initiated, unload initiated, or loaded.

9. The method of claim 6, wherein determining the first light level exceeds the first threshold value comprises determining a predetermined number of samples of the first light level exceeds the first threshold value during a time window.

10. The method of claim 6, further comprising determining a cargo area of the container is not secure when the first light level exceeds the first threshold value and a rate of motion exceeds a first motion threshold value.

11. A non-transitory machine-readable storage medium comprising instructions that, when executed by a processing device, cause the processing device to:
    receive, from a light sensor, a first reading indicating a first light level in a container comprising a container door;
    determine the container door is open in view of the first light level exceeding a first threshold value;
    receive, from the light sensor, a second reading indicating a second light level in the container; and
    determine the container door is closed in view of the second light level falling below a second threshold value.

12. The non-transitory machine-readable storage medium of claim 11, the processing device to:
    de-activate a cargo sensor in view of the second light level falling below the second threshold value.

13. The non-transitory machine-readable storage medium of claim 11, the processing device to collect a sample indicating a cargo state of the container, wherein the cargo state is at least one of empty, load initiated, or loaded.

14. The non-transitory machine-readable storage medium of claim 11, the processing device to determine the first light level exceeds the first threshold value when a predetermined number of samples of the first light level exceeds the first threshold value during a time window.

15. The non-transitory machine-readable storage medium of claim 11, the processing device to determine a cargo area of the container is not secure when the first light level exceeds the first threshold value and a rate of motion exceeds a first motion threshold value.

* * * * *